(12) United States Patent
Sugai et al.

(10) Patent No.: US 6,525,927 B1
(45) Date of Patent: Feb. 25, 2003

(54) FOLDING ELECTRONIC APPARATUS

(75) Inventors: Takashi Sugai, Tottori (JP); Hidekazu Tsutao, Tottori (JP)

(73) Assignees: Sanyo Electric Co., Ltd., Osaka (JP); Tottori Sanyo Electric Co., Ltd, Tottori (JP)

( * ) Notice: Subject to any disclaimer, the term of this patent is extended or adjusted under 35 U.S.C. 154(b) by 0 days.

(21) Appl. No.: 09/647,934

(22) PCT Filed: Apr. 30, 1999

(86) PCT No.: PCT/JP99/02352
§ 371 (c)(1),
(2), (4) Date: Oct. 17, 2000

(87) PCT Pub. No.: WO99/64949
PCT Pub. Date: Dec. 16, 1999

(30) Foreign Application Priority Data

Jun. 10, 1998 (JP) ............................................. 10-162131

(51) Int. Cl.⁷ .................................................. G06F 1/16
(52) U.S. Cl. .................... 361/683; 361/686; 312/223.1; D14/113
(58) Field of Search ................................. 361/679–686; 261/680, 681; 312/223.1, 223.2; 381/24, 87, 88; D14/113, 114

(56) References Cited

U.S. PATENT DOCUMENTS 5,825,614 A * 10/1998 Kim ........................... 361/683

FOREIGN PATENT DOCUMENTS

JP  3-268012 A  * 11/1991  ............. G06F/1/16
JP  4-332016 A  * 11/1992  ............. G06F/1/26

* cited by examiner

Primary Examiner—Darren Schuberg
Assistant Examiner—Yean-Hsi Chang
(74) Attorney, Agent, or Firm—Rader Fishman & Grauer

(57) ABSTRACT

A folding electronic apparatus according to the present invention has a foldable structure by comprising a first frame 3 functioning as a lid and pivoting on a hinge 9 of its main body 2. A first frame 3A comprising a 14-inch flat display panel 5A is longitudinally longer than a first frame 3B comprising a 13-inch flat display panel 5B. A second frame 4A corresponds to the size of the first frame 3A, and a second frame 4B corresponds to the size of the first frame 3B. The second frame 4A may be mounted on the main body 2 when a notebook personal computer 10A using the first frame 3A is fabricated, while the second frame 4B may be mounted on the main body 2 when a notebook personal computer 10B using the first frame 3B is fabricated. Almost complete overlapping between the first frame 3 and the main body (the main body with the second frame) 2 in a case where the first frame 3 is folded can be realized without changing the size of the main body 2.

9 Claims, 5 Drawing Sheets

(a)

(b)

FOLDING ELECTRONIC APPARATUS

TECHNICAL FIELD

The present invention relates to a folding electronic apparatus having a foldable structure by providing with a frame functioning as a lid so as to be rotatable.

BACKGROUND ART

A notebook personal computer, for example, has been known as an electronic apparatus having a foldable structure. A keyboard or the like is arranged on an upper surface of the main body of this type of electronic apparatus, and various types of circuits such as a CPU, a memory, and a power supply circuit are contained in the main body. A frame functioning as a lid is arranged so as to cover the keyboard or the like, and the frame is made rotatable by a hinge provided at a rear end of the main body, for example. A display comprising a flat display panel such as an LCD (Liquid Crystal Display) is provided on a surface, opposite to the keyboard, of the frame. When the electronic apparatus is used, the display can be seen by opening the frame. On the other hand, when the electronic apparatus is carried, the frame is closed, thereby making it possible to enhance portability as well as to prevent the display or the like from being damaged (see JP-A-10-283063 (Japanese Patent Application No. 9-91935), for example).

In this type of electronic apparatus, it is desirable that the frame and the main body are overlapped with each other almost completely in a state where the frame is closed (folded) from the point of view of preventing the display or the like from being damaged. When the size of the frame changes by changing the size of the display, therefore, not only the frame but also the main body must be newly designed and fabricated. However, this causes the development cost to rise.

Even if the display used for this type of electronic apparatus is generally made one size larger, for example, from a 13-inch diagonal to a 14-inch diagonal, the length and the width of the display itself only become larger by a few millimeters, respectively.

In a case where only the size of the display is considered, therefore, the display with a 14-inch diagonal can be mounted on the frame even if the main body and the frame are designed such that their sizes (lengths and breadths) conform to the display with the 13-inch diagonal. In this method, the main body and the frame need not be newly designed and fabricated even when a display which is at least one size larger is desired to be applied.

When the display is made one size larger, however, a driving circuit comprising an inverter or the like for driving the display also increases in size. In the frame conforming to the display with a 13-inch diagonal, it is difficult to incorporate both the display and the driving circuit which both increase in size. Consequently, the length of the frame must be actually made larger by not less than 10 mm. Accordingly, the frame and the main body must be newly designed and fabricated. On the other hand, when the main body and the frame are designed in conformity with a display of a large size, useless areas exist the upper side and the lower side of the frame, when a display which is one size smaller is incorporated, resulting in a bad appearance. Further, the electronic apparatus is not miniaturized even if the size of the display is decreased.

An object of the present invention is to provide a folding electronic apparatus capable of realizing almost complete overlapping between a frame functioning as a lid and its main body in a case where the frame is folded without requiring to change the size of the main body even when the size of the frame is changed.

DISCLOSURE OF INVENTION

In an electronic apparatus so adapted that a first frame functioning as a lid is provided so as to be rotatable and is overlapped with its main body, a folding electronic apparatus according to the present invention is characterized in that a second frame is mounted on the main body in correspondence with an area into which the first frame juts out from the main body when the first frame is overlapped with the main body.

When the size of the first frame is changed, therefore, the second frame corresponding to the size may be thus mounted on the main body. Accordingly, it is possible to realize almost complete overlapping between the first frame and the main body (the main body with the second frame) in a case where the first frame is folded without changing the size of the main body. That is, in two or more types of electronic apparatuses which differ in the size of the first frame, it is possible to reduce the cost of the electronic apparatus by using a common product for their main bodies.

The second frame may be provided at a front edge of the main body. Further, the first frame may be provided with a display. Furthermore, a driving circuit for driving the display may be provided inside the first frame.

An electrical device may be provided inside the second frame, and the electrical device may be connected to an electric circuit inside the main body. Examples of the electrical device include a speaker, a switch, a sensor, a connector, a chip component, a printed circuit board, and a code. Consequently, a space inside the second frame is effectively made use of, thereby making it possible to reduce the burden of containing the electrical device on the main body.

A speaker may be provided as the electrical device inside the second frame, and a sound path for conducting sound from the rear of the speaker into a front of the speaker may be formed in the second frame. Consequently, it is possible to improve the quality of reproduced sound by obtaining a bass reflex effect produced by the sound path.

The electronic apparatus may be so constructed that the first frame is provided with a hook, the second frame is provided with a hole into which the hook is to be inserted, a switch serving as the electrical device is provided inside the second frame in the vicinity of the hole, the hook is engaged with the hole when the first frame is overlapped with the main body, and the switch is operated upon being pressed by the hook. Consequently, it is possible to effectively make use of the space inside the second frame as well as make it possible to carry out various types of control by detecting whether the state of the first frame is a folded state or an opened state.

BRIEF DESCRIPTION OF DRAWINGS

FIG. 1(a) illustrates an electronic apparatus comprising a 14-inch flat display, and FIG. 1(b) illustrates an electronic apparatus comprising a 13-inch flat display;

BEST MODE FOR CARRYING OUT THE INVENTION (Embodiment 1)

Figure 1:
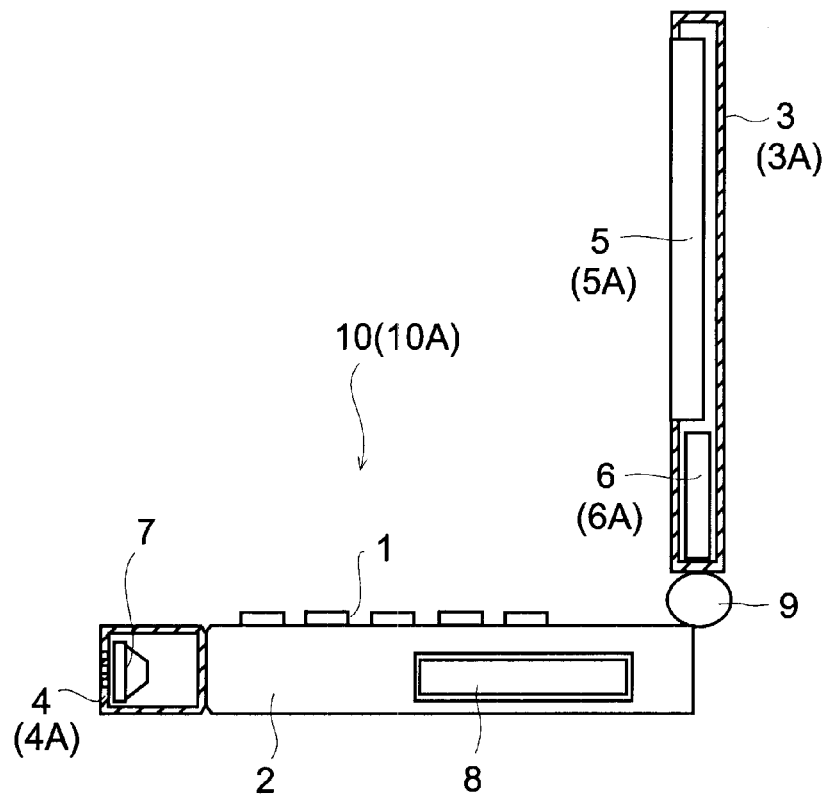
FIG. 1 is a side view (partially in cross section) of an electronic apparatus according to an embodiment 1 of the present invention, where
Figure 1:
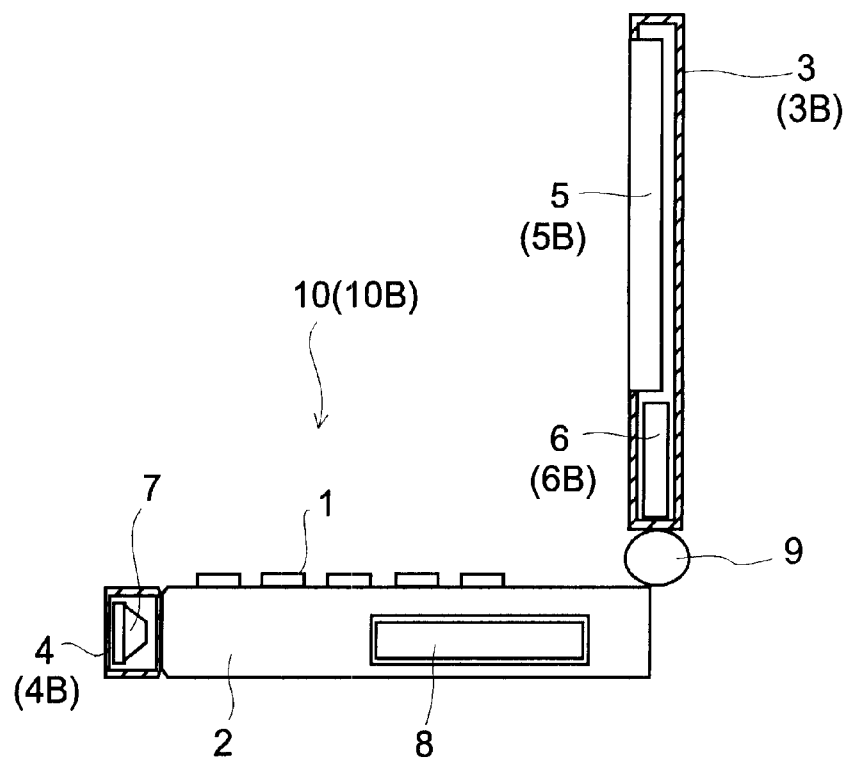

FIGS. 1(a) and (b) illustrate a notebook personal computer 10 (10A and 10B) which is an electronic apparatus according to the present embodiment. A keyboard 1 is provided on an upper surface of the main body 2 of the notebook personal computer 10, various types of circuits such as a CPU, a memory, and a power supply circuit which are not illustrated are contained inside the main body 2, and an opening 8 through which a medium is to be loaded into a drive for an optical disk (a music CD (Compact Disk), a CD-ROM, etc.), an FD (Floppy Disk) drive, or the like is formed on a side surface of the main body 2.

A first frame 3 (3A, 3B) is provided so as to be rotatable by a hinge provided at a rear end (a right end in FIG. 1) of the main body 2. When the first frame 3 is closed (folded), the keyboard 1 is covered with the first frame 3. A flat display panel 5 (5A, 5B) such as an LCD is provided on a surface, opposite to the main body 2, of the first frame 3. In the present embodiment, the flat display panel 5A is 14 inches diagonal, and the flat display panel 5B is 13 inches diagonal. A driving circuit 6 (6A, 6B) having an inverter or the like for driving the flat display panel 5 is arranged in a space inside the first frame 3 and below the flat display panel 5. The driving circuit 6A is slightly larger than the driving circuit 6B.

When the notebook personal computer 10 is used, the first frame 3 is opened, so that the keyboard 1 appears, and the flat display panel 5 can be seen. On the other hand, when the notebook personal computer 10 is carried, the first frame 3 is closed (folded), thereby making it possible to enhance portability as well as to prevent the flat display panel 5 from being damaged.

The first frame 3 is longitudinally longer than the main body 2. When the first frame 3 is closed, the first frame 3 juts out from a front edge (a left edge in FIG. 1) of the main body 2. A second frame 4 (4A, 4B) in the shape of an approximately square box is mounted on the front edge of the main body 2. The second frame 4A has a size (a depth) corresponding to the degree at which the first frame 3A juts out, and the second frame 4B has a size (a depth) corresponding to the degree at which the first frame 3B juts out.

A speaker 7 is provided inside the second frame 4. The speaker 7 is connected to a sound signal output circuit inside the main body 2 by wiring (not shown). By providing the speaker 7 inside the second frame 4, a space in the second frame 4 is effectively made use of. Accordingly, it is possible to reduce the burden of containing an electrical device on the main body 2 in a case where the speaker 7 is contained in the main body 2 as well as to prevent sound from the speaker 7 from being interrupted by the second frame 4.

The first frame 3A comprising the 14-inch flat display panel 5A and the first frame 3B comprising the 13-inch flat display panel 5B differ in length. In the personal computer 10A and the personal computer 10B, however, the main bodies 2 respectively used for the personal computers are the same. Even if the main bodies 2 are the same, the length of the main body with the second frame can coincide with the length of the first frame 3A or the first frame 3B depending on which of the second frame 4A and the second frame 4B is to be mounted. Consequently, it is possible to realize almost complete overlapping between the first frame 3 and the main body 2 (the main body with the second frame) in a case where the first frame 3 is folded without changing the length of the main body 2. A common product is used for the main bodies 2, thereby making it possible to reduce the cost of the notebook personal computer 10A or 10B.

Employed a relatively thin speaker as the speaker 7 so that the speaker 7 is contained in both the second frame 4A and the second frame 4B. Consequently, it is possible to restrain such a functional influence in the apparatus that the personal computer 10A has a speaker, while the personal computer 10B has no speaker, for example, depending on the difference in the depth between the second frame 4A and the second frame 4B.

(Embodiment 2)

Figure 2:
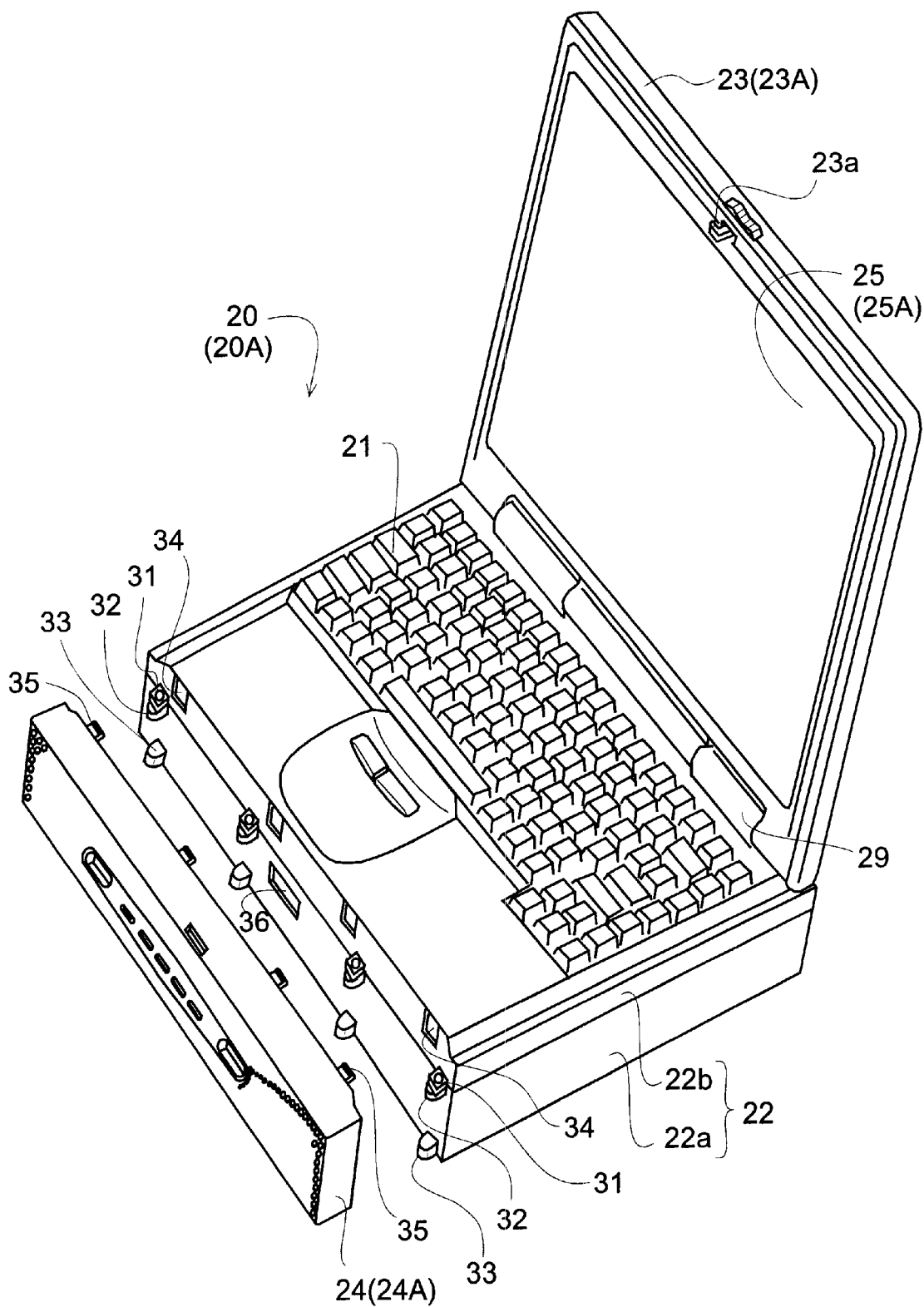
FIG. 2 is a perspective view of an electronic apparatus (comprising a 14-inch flat display) according to an embodiment 2 of the present invention.
Figure 4:
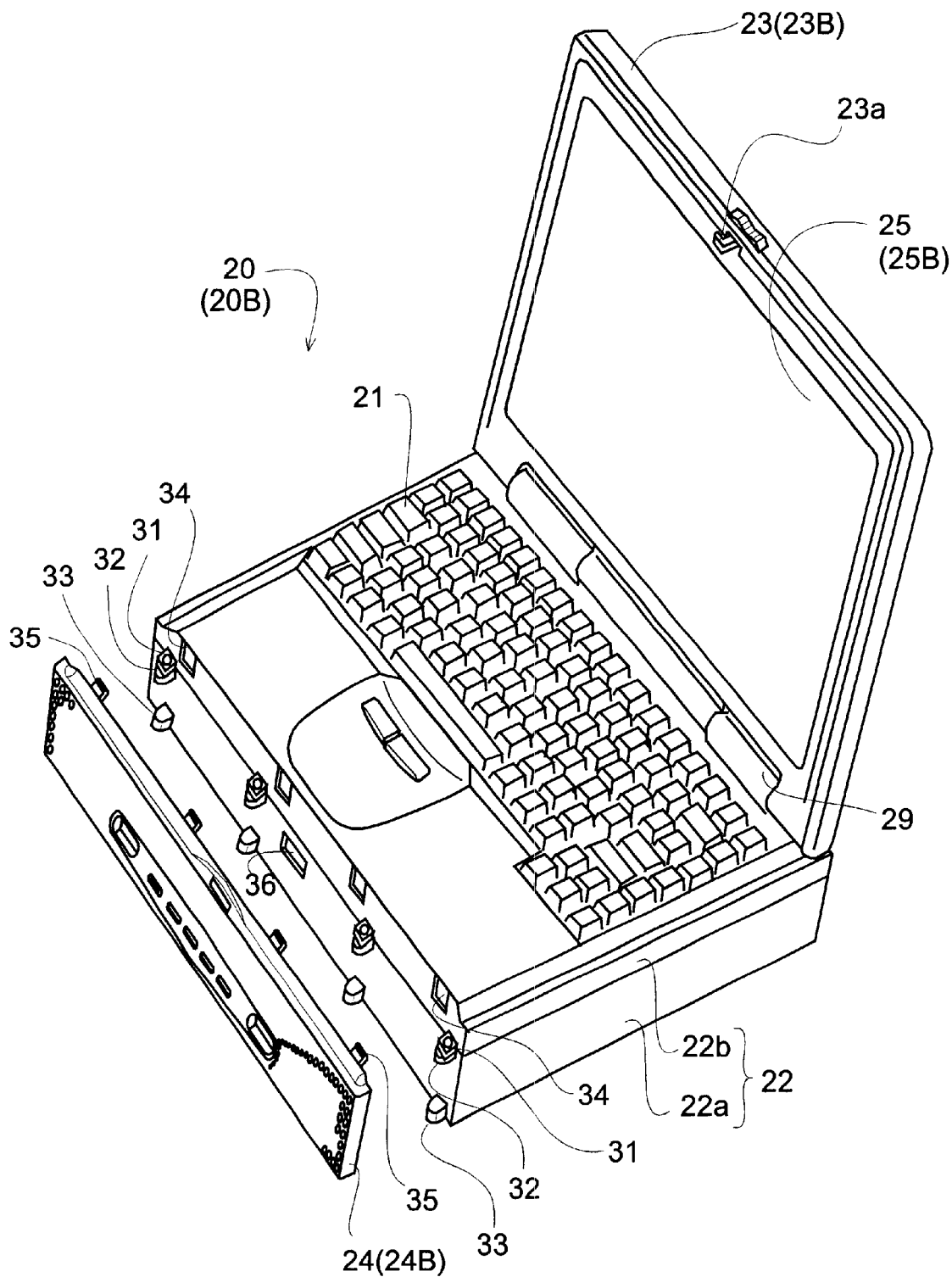
FIG. 4 is a perspective view of an electronic apparatus (comprising a 13-inch flat display) according to the embodiment 2 of the present invention.

FIGS. 2 and 4 illustrate a notebook personal computer 20 (20A and 20B) which is an electronic apparatus according to the present embodiment. A keyboard 21 is provided on an upper surface of the main body 22 of the notebook personal computer 20, various types of circuits such as a CPU, a memory, and a power supply circuit which are not illustrated are contained inside the main body 22, and an opening through which a medium is to be loaded (not shown) into a drive for an optical disk (a music CD, a CD-ROM, etc.), an FD drive, or the like is formed on a side surface of the main body 22.

A first frame 23 (23A, 23B) is provided so as to be rotatable by a hinge 29 provided at a rear end of the main body 22. When the first frame 23 is closed (folded), the keyboard 21 or the like can be covered with the first frame 23. A flat display panel 25 (25A, 25B) such as an LCD is provided on a surface, opposite to the main body 22, of the first frame 23. In the present embodiment, the flat display panel 25A is 14 inches diagonal, and the flat display panel 25B is 13 inches diagonal. A driving circuit (not shown) having an inverter or the like for driving the flat display panel 25 is arranged in a space inside the first frame 23 and below the flat display panel 25.

The main body 22 comprises a box-shaped frame portion 22a and a cover 22b arranged on the box-shaped frame portion 22a. Four projections 31 each having a screw insertion hole are formed with predetermined spacing at a front edge of the cover 22b. Further, four engaging openings 34 are formed. Four projections 32 and four projections 33 each having a tapped hole are formed with the same spacing as the predetermined spacing, respectively, on the upper and lower sides of a front edge of the box-shaped frame portion 22a. The projection 31 and the projection 32 are overlapped with each other, and a screw (not shown) is screwed into the tapped hole of the projection 32 through the screw insertion hole of the projection 31, thereby making it possible to fix the cover 22b to the box-shaped frame portion 22a.

The first frame 23 is longitudinally longer than the main body 22. When the first frame 23 is closed, the first frame 23 juts out from a front edge of the main body 22. A second frame 24 (24A, 24B) in the shape of an approximately square box and with opening on the side of its body to which the main body 22 is to be fixed is fixed to the front edge of the main body 22. The second frame 24A has a size (a depth) corresponding to the degree at which the first frame 23A juts out, and the second frame 24B has a size (a depth) corresponding to the degree at which the first frame 23B juts out.

Engaging projections 35 are formed at an upper edge of a rear end of the second frame 24 in correspondence with the spacing at which the engaging openings 34 are arranged, and screw insertion holes (not shown) are formed at a lower edge of the rear end in correspondence with the spacing at which the projections 33 are arranged. The engaging projection 35 is inserted into the engaging opening 34, and a screw is screwed into the tapped hole formed on a base of the projection 33 through the screw insertion hole of the second frame 24, thereby making it possible to fix the second frame 24 to the main body 22.

Figure 3:
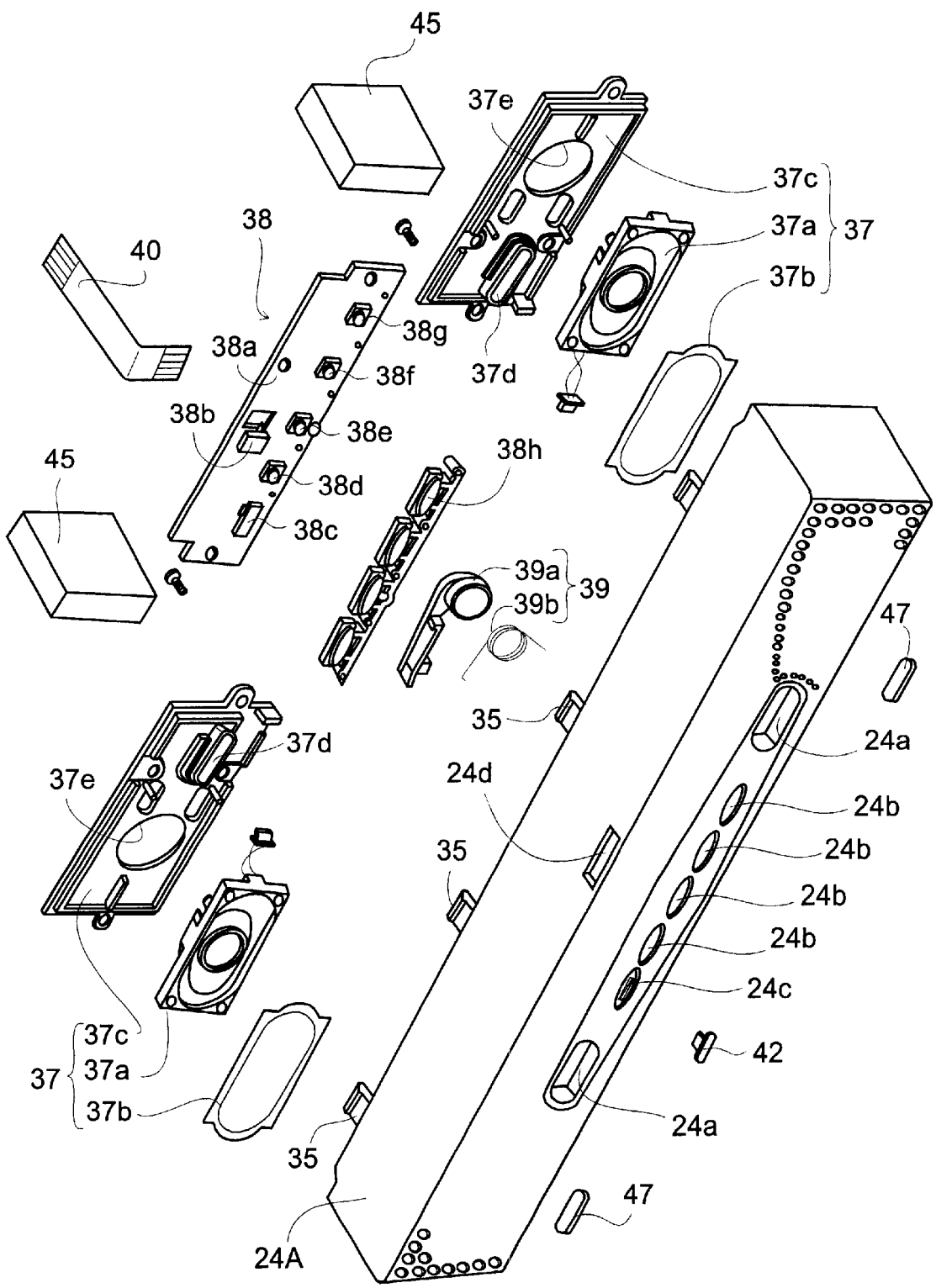
FIG. 3 is a perspective view showing a second frame shown in FIG. 2 and an electrical device, etc. disposed inside the frame.
Figure 5:
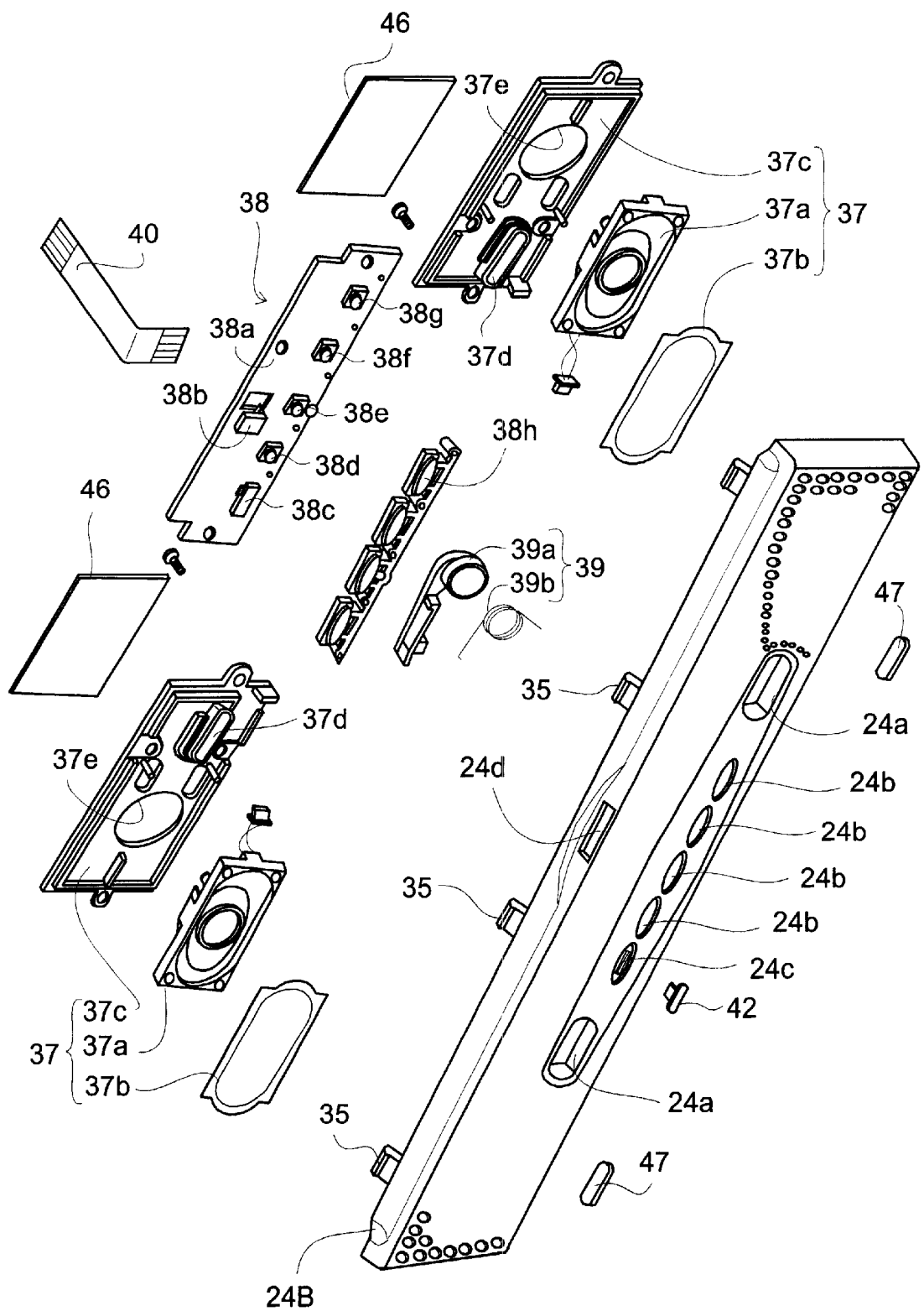
FIG. 5 is a perspective view showing a second frame shown in FIG. 4 and an electrical device, etc. disposed inside the frame.

As shown in FIGS. 3 and 5, a pair of speaker units 37, a switch unit 38, an operation lever unit 39, and flexible wiring 40 are provided inside the second frame 24.

The speaker unit 37 comprises a speaker 37a, a front cover 37b arranged on the side of a front surface of the speaker 37a, and a back cover 37c for fixing the speaker 37a to the second frame 24. A through path 37d in an approximately elliptical shape and a circular opening 37e corresponding to a circular part of a back of the speaker are formed in the back cover 37c. The through path 37d is fitted in a back of a through path 24a in an approximately elliptical shape which is formed in the second frame 24, thereby forming a sound path for conducting sound from the rear of the speaker into a front of the second frame 24. It is possible to improve the quality of reproduced sound by a bass reflex effect produced by the sound path.

The switch unit 38 comprises a printed circuit board 38a, switches 38b, 38c, 38d, 38e, 38f, and 38g provided in the printed circuit board 38a, and a switch cover 38h having four cover portions respectively covering the switches 38d, 38e, 38f, and 38g.

The cover portions of the switch cover 38h are positioned on a surface of the second frame 24, respectively, through four openings 24b formed in the second frame 24. Further, the switch 38c is a slide switch, and is operated by a slide operating member 42 mounted on an opening 24c of the second frame 24. The switches 38c to 38g are switches for playing a music CD, for example, loaded in a disk driver (not shown) of the main body 22, the switch 38c is an ON/OFF switch, the switch 38d is a play switch, the switch 38e is a stop switch, the switch 38f is a backward switch, and the switch 38g is a forward switch.

The switch 38b is provided in a position corresponding to the operation lever unit 39. The operation lever unit 39 comprises an operation lever 39a and a coiled spring 39b. The operation lever 39a is provided so as to be pivotable around a horizontal axis (not shown) formed on the back surface of the second frame 24, and is urged in a clockwise direction in the drawing by the coiled spring 39b. When the operation lever 39a is rotated in a counterclockwise direction against the urging of the coiled spring 39b, an operation projection of the operation lever 39a is moved downward, to press an operating member of the switch 38b (ON). On the other hand, when the operation lever 39a is rotated in a clockwise direction by the urging of the coiled spring 39b, the operation projection is moved upward, to release the pressing against the operating member of the switch 38b (OFF).

On an upper surface of the second frame 24, an opening 24d is formed in correspondence with the position where the operation lever 39a is mounted. Further, the opening 24d also corresponds to the position where a hook 23a (see FIGS. 2 and 4) which is provided so as to be slidable in the lateral direction at an upper edge of the first frame 23 (a front edge in a folded state) is mounted. When the first frame 23 is closed (folded), the hook 23a enters the opening 24d, to engage the first frame 23, and pushes down the operation projection of the operation lever 39a. When the operation projection is pushed down, the operating member of the switch 38b is pressed.

The switch 38b is turned on/off, to control its suspend/resume state and to control lights-out/lighting of a backlight of the flat display panel 25, and so on, while the personal computer is being run, for example. Further, it controls the ineffectiveness/effectiveness of the turn-on of a main power supply switch while the personal computer is not being run. Specifically, in a case where the first frame 23 is closed (the switch 38b is turned on) while the personal computer is not being run, even if the main power supply switch is turned on, which is not intended, by vibration, contact, or the like, the turn-on of the main power supply switch is made ineffective.

A connector (not shown) is provided on a back surface of the printed circuit board 38a. To the connector, a connector of the speaker 37a can be connected. One end of the flexible wiring 40 is connected to the printed circuit board 38a, and the other end of the flexible wiring 40 is connected to a circuit inside the main body 22 through an opening formed at the front edge of the main body 22. The on-off of each of the switches is transmitted to the circuit inside the main body through the flexible wiring 40, and a sound signal from a sound signal output circuit inside the main body is supplied to the speaker 37a.

The depth of the second frame 24A is relatively large. A flexible block 45 having a size almost corresponding to the depth is provided between the front edge of the main body 22 and the back cover 37c. On the other hand, the depth of the second frame 24B is small. A flexible sheet 46 having a thickness almost corresponding to the depth is provided between the front edge of the main body 22 and the back cover 37c.

Rubber projections 47 are respectively attached to two portions on a lower surface of each of the second frames 24A and 24B. The rubber projections 47 are brought into contact with a desk or the like on which the personal computer 20 is placed. In such construction that a removable floppy disk driver and battery, and so forth are provided on a lower surface of the main body 22, when the rubber projections are provided on the lower surface of the main body 22, the arrangement of the rubber projections is under positional restriction. In such construction that the rubber projections 47 are provided on the lower surface of the second frame 24, as described above, the arrangement may not be under such restriction.

The first frame 23A comprising the 14-inch flat display panel 25A and the first frame 23B comprising the 13-inch flat display panel 25B differ in length. In the personal computer 20A and the personal computer 20B, however, the main bodies 22 respectively used for the personal computers are the same. Even if the main bodies 22 are the same, the length of the main body with the second frame can coincide with the length of the first frame 23A or the first frame 23B depending on which of the second frame 24A and the second frame 24B is to be mounted. Consequently, it is possible to realize almost complete overlapping between the first frame 23 and the main body 2 (the main body with the second frame) in a case where the first frame 23 is folded without changing the length of the main body 2. A common product is used for the main bodies 22, thereby making it possible to reduce the cost of the notebook personal computer 20A or 20B.

Employed a relatively thin speaker as the speaker unit 37 so that the speaker unit 37 is contained in both the second frame 24A and the second frame 24B. Consequently, it is possible to restrain such a functional influence in the apparatus that the personal computer 20A has a speaker, while the personal computer 20B has no speaker, for example, depending on the difference in the depth between the second frames 24A and 24B.

Since the second frame 24 contains the speaker unit 37, the switch unit 38, and so forth, a space inside the second frame 24 is effectively made use of, thereby making it possible to reduce the burden of containing the electrical device on the main body 22. Since the switches can be operated on the front surface of the second frame 24, it is possible to play a music CD or the like, for example, even in a state where the first frame 23 is closed (folded).

The folding electronic apparatus includes a so-called mobile device, an electronic notebook, and so forth in addition to the notebook personal computer. The second frame 24 can be provided with a sensor, a connector, a chip component, and so forth in addition to the speaker, the switch, and the printed circuit board.

In the embodiment 1 and the embodiment 2, the first frame is rotated around the horizontal axis in the lateral direction, the first frame may be rotated around the horizontal axis in the longitudinal direction. Although the second frame is mounted on the front edge of the main body, the second frame may be provided at a rear edge of the main body. Further, the first frame may be attached to the second frame by using a hinge.

Although as illustrated in the embodiment 1 and the embodiment 2, it is preferable that an opening through which a medium is to be loaded into a CD drive, an FD drive, or the like is formed on a side surface of the main body, the opening may be provided at a front edge of the main body. When the opening is provided at the front edge of the main body, the second frame may be mounted on the main body so as to be removable (movable). It goes without saying that even in such construction that the opening is not provided at the front edge of the main body, the second frame may be mounted on the main body so as to be removable (movable).

What is claimed is:

1. A folding electronic apparatus, comprising:
    a box-shaped main body having a main body front end wall, a main body rear end wall and a main body top wall defining a top surface main body area and extending to and between the main body front end wall and the main body rear end wall with the main body front end wall and main body rear end wall connected perpendicularly to the main body top wall;
    a box-shaped first frame defining a first frame surface area and pivotally mounted to the rear end wall of the main body to move to and between an open position wherein the first frame is angularly disposed away from the main body and a closed position wherein the first frame is disposed with the main body in a facially opposing relationship; and
    a box-shaped second frame having a second frame front end wall, a second frame rear end wall and a second frame top wall defining a top surface second frame area, the second frame top wall extending to and between the second frame front end wall and the second frame rear end wall with the second frame front end wall and the second frame rear end wall connected perpendicularly to the second frame top wall and operably connected to the main body in a manner such that the second frame rear end wall and the main body front end wall are in facial contact with each other and the main body top wall and the second frame top wall are disposed in a common plane
    wherein when the first frame is in the closed position and the second frame is connected to the main body, the first frame overlaps the main body and the second frame such that the first frame surface area covers both the top surface main body area and the top surface second frame area in a facially-opposing relationship.

2. The folding electronic apparatus according to claim 1, characterized in that said first frame is provided with display means.

3. The folding electronic apparatus according to claim 2, characterized in that a driving circuit for driving said display means is provided inside the first frame.

4. The folding electronic apparatus according to any one of claims 2 and 3, characterized in that an electrical device is provided inside said second frame, and the electrical device is connected to an electric circuit inside the main body.

5. The folding electronic apparatus according to claim 4, characterized in that a speaker is provided as said electrical device inside said second frame, and a sound path for conducting sound from the rear of said speaker into a front of the speaker is formed in the second frame.

6. The folding electronic apparatus according to claim 4, characterized in that said first frame is provided with a hook, said second frame is provided with a hole into which said hook is to be inserted, a switch serving as said electrical device is provided inside the second frame in the vicinity of the hole, said hook is engaged with said hole when the first frame is overlapped with the main body, and said switch is operated upon being pressed by said hook.

7. The folding electronic apparatus according to claim 1, wherein the first frame surface area is sized and configured equal or substantially equal to the top surface main body area and the top surface second frame area when the main body and the second frame are connected together.

8. A folding electronic apparatus, comprising:
    a box-shaped main body having a flat main front end wall and a flat main rear end wall disposed opposite the main front end wall and a main top wall connected perpendicularly to and between the main front and rear end walls to define a top surface main body area;
    a box-shaped secondary body having a flat secondary front end wall and a flat secondary rear end wall disposed opposite the secondary front end wall and a secondary top wall connected perpendicularly to and between the secondary front and rear end walls to define a top surface secondary body area, the secondary body removably connected to the main body in a manner that the secondary rear end wall and the main front end wall contact each other in a facially opposing relationship orienting the top surface main body area and the top surface secondary body area in a common plane and in juxtaposition to each other to form a combined top surface area when the main body and the secondary body are connected together;
    a box-shaped lid defining a lid surface area and pivotally mounted along an edge adjacent to the main rear end wall of the main body to pivot to and between an opened position wherein the lid is angularly disposed away from the main body and the secondary body, when connected together, and a closed position wherein the lid is disposed with the main body and the secondary body connected together in a facially opposing relationship such that the lid surface area completely covers the combined top surface area;
    a main electrical circuit contained in the main body;
    a secondary electrical circuit contained in the secondary body; and
    a tertiary electrical circuit contained in the lid,
    wherein the main electrical circuit and the secondary electrical circuit being operably connected together upon connecting the main body and the secondary body together and the main electrical circuit and the tertiary electrical circuit being operably connected together upon connecting the main body and the lid together.

9. A folding electronic apparatus according to claim 8, wherein the lid surface area and the combined top surface area are sized and configured to either equal or substantially equal each other.

* * * * *